US006487256B2

(12) United States Patent
Kroeger et al.

(10) Patent No.: US 6,487,256 B2
(45) Date of Patent: *Nov. 26, 2002

(54) METHOD AND APPARATUS FOR AM DIGITAL BROADCASTING

(75) Inventors: Brian William Kroeger, Sykesville, MD (US); E. Glynn Walden, Marlton, NJ (US); George Nicholas Eberl, Columbia, MD (US)

(73) Assignee: Ibiquity Digital Corporation, Columbia, MD (US)

(*) Notice: Subject to any disclaimer, the term of this patent is extended or adjusted under 35 U.S.C. 154(b) by 0 days.

This patent is subject to a terminal disclaimer.

(21) Appl. No.: 09/834,077

(22) Filed: Apr. 12, 2001

(65) Prior Publication Data

US 2001/0021231 A1 Sep. 13, 2001

Related U.S. Application Data

(62) Division of application No. 09/049,217, filed on Mar. 27, 1998, now Pat. No. 6,243,424.

(51) Int. Cl.[7] .................................................. H04L 5/12
(52) U.S. Cl. ...................................................... 375/265
(58) Field of Search ................................ 375/265, 261, 375/298, 316, 321, 300, 301; 455/46, 108, 109, 47, 202

(56) References Cited

U.S. PATENT DOCUMENTS

| | | | | |
|---|---|---|---|---|
| 3,488,445 A | | 1/1970 | Chang | 179/15 |
| 5,040,217 A | | 8/1991 | Brandenburg et al. | 381/47 |
| 5,228,025 A | | 7/1993 | Le Floch et al. | 370/20 |
| 5,285,498 A | | 2/1994 | Johnston | 381/2 |
| 5,465,396 A | * | 11/1995 | Hunsinger et al. | 455/61 |
| 5,481,614 A | | 1/1996 | Johnston | 381/2 |
| 5,483,694 A | * | 1/1996 | Bartels et al. | 455/295 |
| 5,588,022 A | | 12/1996 | Dapper et al. | 375/216 |
| 5,633,896 A | | 5/1997 | Carlin et al. | 375/340 |
| 5,673,292 A | | 9/1997 | Carlin | 375/269 |
| 5,742,898 A | * | 4/1998 | Brekelmans | 455/193.1 |
| 5,949,796 A | * | 9/1999 | Kumar | 370/529 |
| 6,243,424 B1 | * | 6/2001 | Kroeger et al. | 375/265 |

OTHER PUBLICATIONS

B. Kroeger, A. Vigil, "Improved IBOC DAB Technology For AM and FM Broadcasting", Oct. 1996.

M. Alard, R. Lassale, "Principles of modulation and channel coding for digital broadcasting for mobile receivers", EBU Review, No. 224, pp. 168–190, Aug. 1987.

* cited by examiner

*Primary Examiner*—Chi Pham
*Assistant Examiner*—Khai Tran
(74) *Attorney, Agent, or Firm*—Robert P. Lenart, Esq.; Pietragallo, Bosick & Gordon

(57) ABSTRACT

A method for AM in-band-on-channel (IBOC) digital audio broadcasting (DAB) uses a center channel signal in a central frequency band of an AM radio channel, the center channel signal is modulated by first and second versions of the program material to be transmitted. Sub-carriers in a upper and lower sidebands of the AM radio channel are modulated with addition digitally encoded portions of the program material. The upper sideband lies within a frequency band extending from about +5 k Hz to about +10 kHz from a center frequency of the radio channel and the lower sideband lying within a frequency band extending from about −5 k Hz to about −10 kHz from the center frequency of the radio channel. The center channel signal the upper and lower sideband sub-carriers are transmitted to receivers. In a hybrid IBOC DAB version, the center channel signal includes a carrier which is analog modulated by the first version of the program material and additional sub-carriers modulated by the second version of the program material, wherein the additional sub-carriers are transmitted at a power spectral density level that is less than the power spectral density of the analog modulated carrier. In an all-digital version, the center channel signal includes two groups of sub-carriers modulated with the program material.

19 Claims, 3 Drawing Sheets

METHOD AND APPARATUS FOR AM DIGITAL BROADCASTING

CROSS REFERENCE TO RELATED APPLICATION

This application is a divisional application of application Ser. No. 09/049,217, filed Mar. 27, 1998, now U.S. Pat. No. 6,243,424.

BACKGROUND OF THE INVENTION

This invention relates to radio broadcasting, and more particularly, to modulation formats for use in AM In-Band-On-Channel (IBOC) Digital Audio Broadcasting (DAB), and broadcasting systems utilizing such modulation formats.

Digital Audio Broadcasting is a medium for providing digital-quality audio, superior to existing analog broadcasting formats. AM IBOC DAB can be transmitted in a hybrid format where it coexists with the AM signal, or it can be transmitted in an all-digital format where the removal of the analog signal enables improved digital coverage with reduced interference. Initially the hybrid format would be adopted allowing existing receivers to continue to receive the AM signal while allowing new IBOC receivers to decode the DAB signal. In the future, when IBOC receivers are abundant, a broadcaster may elect to transmit the all-digital format. The DAB signal of the all-digital format is even more robust than the hybrid DAB signal because of allowed increased power of the former with a digital time diversity backup channel. IBOC requires no new spectral allocations because each DAB signal is simultaneously transmitted within the same spectral mask of an existing AM channel allocation. IBOC promotes economy of spectrum while enabling broadcasters to supply digital quality audio to their present base of listeners.

U.S. Pat. No. 5,588,022 discloses a hybrid AM IBOC broadcasting method for simultaneously broadcasting analog and digital signals in a standard AM broadcasting channel that includes the steps of: broadcasting an amplitude modulated radio frequency signal having a first frequency spectrum, wherein the amplitude modulated radio frequency signal includes a first carrier modulated by an analog program signal; and simultaneously broadcasting a plurality of digitally modulated carrier signals within a bandwidth which encompasses the first frequency spectrum, each of the digitally modulated carrier signals being modulated by a portion of a digital program signal, wherein a first group of the digitally modulated carrier signals lying within the first frequency spectrum are modulated in-quadrature with the first carrier signal, and wherein second and third groups of the digitally modulated carrier signals lie outside of the first frequency spectrum and are modulated both in-phase and in-quadrature with the first carrier signal. Recent developments in AM IBOC DAB systems are discussed generally in "Improved IBOC DAB Technology for AM and FM Broadcasting," by B. Kroeger, and A. J. Vigil, presented at the 1996 National Association of Broadcasters SBE Conference, Los Angeles, Calif., Nov., 1996.

As audio coding algorithms continue to improve, acceptable audio quality can be obtained at lower data rates and with less error protection due to embedded techniques than were envisioned for use in the method of U.S. Pat. No. 5,588,022. This invention seeks to provide methods for AM IBOC hybrid and all-digital broadcasting which take advantage of the characteristics of recently developed coding algorithms and addresses the typical interference patterns of AM broadcasting channels.

SUMMARY OF THE INVENTION

This invention provides a method of broadcasting comprising the steps of providing a center channel signal in a central frequency band of an AM radio channel, the center channel signal being modulated by first and second versions of program material to be transmitted; providing a first plurality of sub-carriers in an upper sideband of the AM radio channel, the upper sideband lying within a frequency band extending from about +5 kHz to about +10 kHz from the center frequency of the radio channel; modulating the first plurality of sub-carriers with first additional program material; providing a second plurality of sub-carriers in a lower sideband of the AM radio channel, the lower sideband lying within a frequency band extending from about −5 kHz to about −10 kHz from the center frequency of said radio channel; modulating the second plurality of sub-carriers with second additional program material; and transmitting the center channel signal, the first plurality of sub-carriers and the second plurality of sub-carriers.

In the hybrid IBOC DAB embodiment of the invention, the center channel signal comprises an analog modulated carrier being modulated by the first version of the program material; and a third plurality of sub-carriers being modulated by the second version of the program material, wherein the third plurality of sub-carriers are transmitted at a power spectral density level that is less than the power spectral density of the analog modulated carrier. In an all-digital embodiment of the invention, the center channel signal comprises a third plurality of sub-carriers modulated with the first version of the program material; and a fourth plurality of sub-carriers modulated with the second version of the program material.

One objective of the AM IBOC formats proposed here is to maximize commonality between the hybrid and all-digital systems. Both hybrid and all-digital systems proposed here can employ the same forward error correction (FEC) scheme. Furthermore both modulation formats are very similar where the only major difference is that a digital tuning and backup digitally encoded channel of the all-digital system replaces the analog AM signal of the hybrid system within the same spectral location. The sub-carriers use OFDM formats such that segments of the compressed audio code can be strategically assigned to subcarrier locations to allow for graceful degradation as channel interference increases.

DESCRIPTION OF THE PREFERRED EMBODIMENTS

Figure 1:
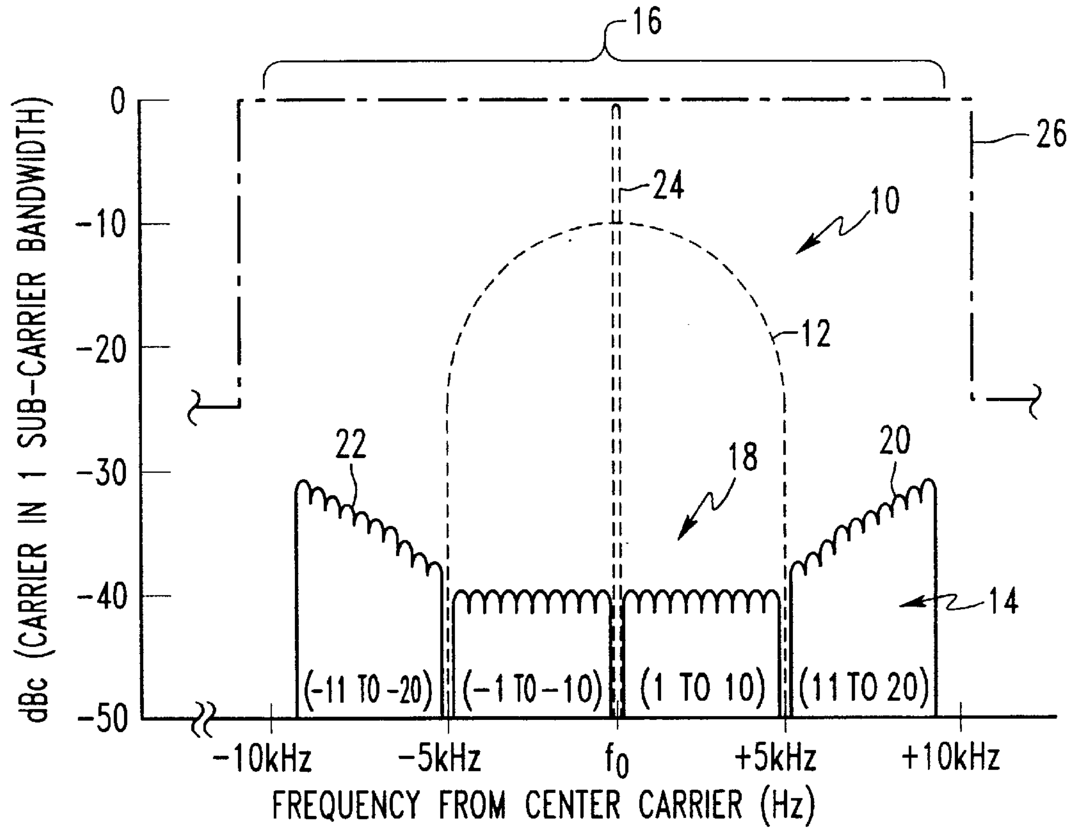
FIG. 1 is a schematic representation of an AM hybrid IBOC spectrum used in one embodiment of the invention, showing relative levels of AM and DAB signals.

Referring to the drawings, FIG. 1 is a schematic representation of an AM hybrid IBOC spectrum 10 used in one embodiment of the invention. The hybrid format includes the conventional AM analog signal 12 (bandlimited to +-5 kHz) along with a nearly 20 Hz wide DAB signal 14 transmitted beneath the AM signal. The spectrum is contained within a channel 16 having a bandwidth of 20 Hz. The channel is divided into a central frequency band 18, and upper 20 and lower 22 frequency bands. The central frequency band is about 10 kHz wide and encompasses frequencies lying within plus and minus 5 kHz of the central frequency of the channel. The upper sideband extends from about +5 kHz from the central frequency to about +10 kHz from the central frequency. The lower sideband extends from about −5 kHz from the central frequency to about −10 kHz from the central frequency.

The AM hybrid IBOC DAB signal is comprised of the analog AM signal 24 plus 40 OFDM sub-carriers locations spaced at approximately 454.216 Hz, spanning the central frequency band and the upper and lower sidebands. Coded digital information representative of the audio or data signals to be transmitted (program material), is transmitted on the sub-carriers. The symbol rate of each of the sub-carriers is approximately 430.664 Hz. Notice that the symbol rate is less than the sub-carrier spacing due to a guard time between symbols.

The center sub-carrier 24, at frequency $f_0$, is not QAM modulated, but carries the main AM carrier plus a synchronization signal modulated in quadrature to the carrier. The remaining sub-carriers positioned at locations designated as 1 through 20 on either side of the AM carrier are modulated with 32-QAM. Sub-carrier designations are shown in parentheses above the frequency scale in FIG. 1. In one embodiment of the invention, 32-QAM sub-carriers are positioned in the central frequency band beneath the AM signal. Sub-carrier locations 1 through 10 on either side of the central frequency, are transmitted in complementary pairs such that the modulated resultant DAB signal is in quadrature to the analog modulated AM signal. Signal processing techniques are employed to reduce the mutual interference between the AM and DAB signals. Sub-carriers 11 through 20 on either side are independently modulated 32 QAM sub-carriers. The powers of sub-carriers 20 through 16 on either side are decreased from a maximum of −30 dBc for the outer sub-carrier 20 down to about −40 dBc for sub-carrier 16 in order to minimize interference to the analog AM signal. Using this format, the analog modulated carrier and all digitally modulated sub-carriers are transmitted within the channel mask 26 specified for standard AM broadcasting in the United States.

The preferred embodiment of the modulation format illustrated by FIG. 1 uses perceptual audio coding. However, it must be understood that other coding techniques can be used if they provide the information throughput necessary to provide an adequate signal quality at the receiver. The central frequency band 18 encompasses a bandwidth of about 10 kHz, and defines the locations of ten evenly spaced complementary sub-carrier pairs that are modulated in quadrature to the analog AM signal 12 using 32-QAM. These sub-carriers are used to transmit a digitally encoded version of the program material to be transmitted at a throughput rate of 16 kbps. The upper sideband 20 contains 10 evenly spaced sub-carriers that also use 32 QAM to transmit digital information representative of additional program material. Similarly, the lower sideband 22 contains 10 evenly spaced sub-carriers that also use 32 QAM to transmit digital information representative of additional program material. This additional program material may be, for example, the stereo or high frequency components of the program material. The digitally encoded information in either sideband can be decoded and combined with the digitally information transmitted in the central frequency band to provide compressed audio at a 32 kbps rate. When both sidebands are available the effective rate is 48 kbps.

A blend-to-analog feature with time diversity is also employed in the AM hybrid DAB system to yield robust performance in adverse conditions. By transmitting the same program material in the two signal components in the central frequency band, a receiver can switch to one of the signal components if the other becomes corrupted.

Figure 2:
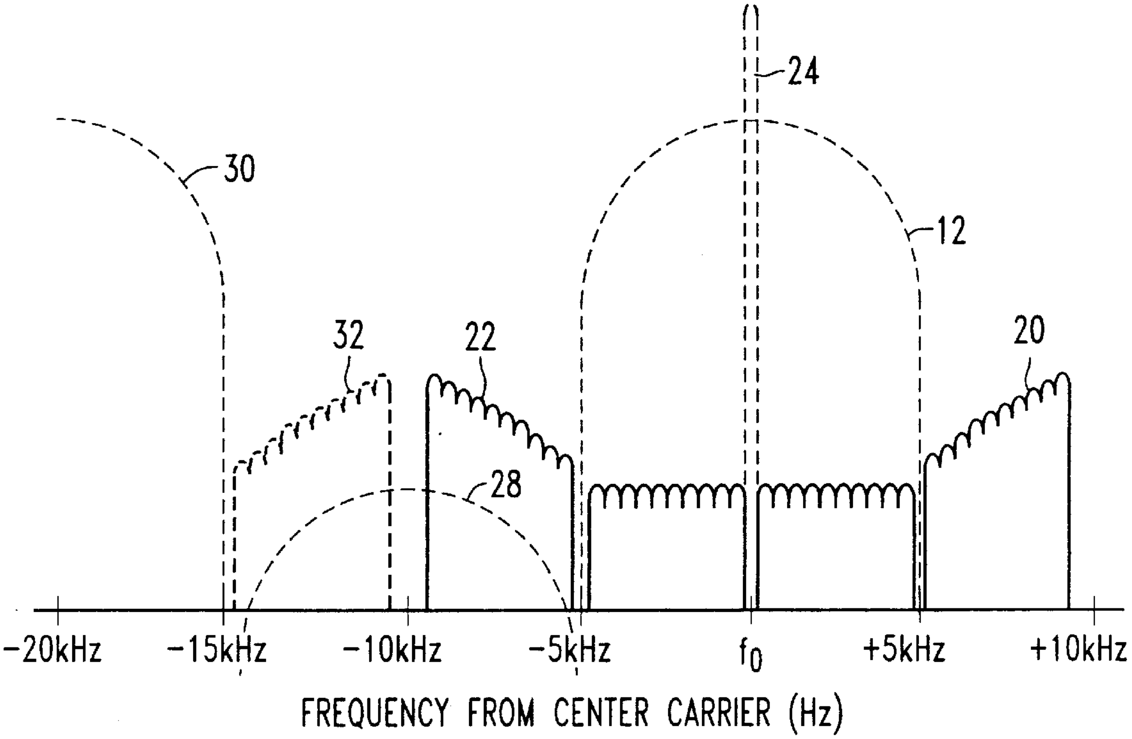
FIG. 2 is schematic representation of the AM hybrid IBOC spectrum of FIG. 1, with portions of the spectrum of first and second adjacent channels.

FIG. 2 is a schematic representation of the spectrum of the hybrid IBOC DAB broadcasting format of FIG. 1, with representations of portions of hybrid IBOC DAB signals of the first and second adjacent channels. The conventional analog signal 28 of the first adjacent channel is shown at a reduced spectral power density level. The sub-carriers of the lower sideband 22 of spectrum 10 are shown to have increasing power spectral densities as the sub-carriers are spaced farther from the center of the main channel. This provides increased power in the outer sub-carriers to account for expected increased interference from the analog modulated signal in the first adjacent channel. The spectrum of the second adjacent channel 30 contains an upper sideband 32. In view of the channel spacings, there is no overlap between the spectrums of the channel of interest and the second adjacent channel.

Figure 3:
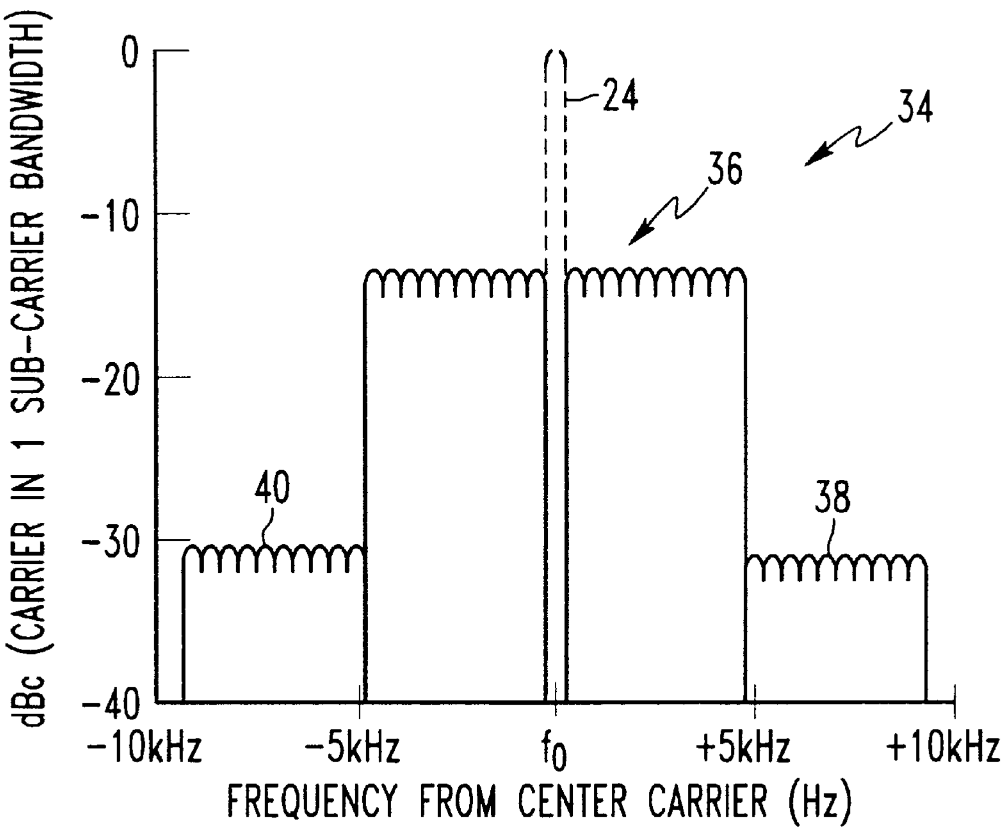
FIG. 3 is a schematic representation of an AM all-digital IBOC spectrum used in another embodiment of the invention, showing relative levels of DAB signals.

FIG. 3 is a schematic representation of the spectral placement of an all-digital IBOC DAB broadcasting format 34 embodiment of the invention. The power of the central frequency band 36 sub-carriers (1 through 10 on each side of the channel center frequency) is increased, relative to the hybrid format of FIG. 1, to −13 dBc. The remaining sub-carriers in the upper sideband 38 and the lower sideband 40 are increased to a uniform −30 dBc since the interference to the analog AM host is not an issue in the all-digital system.

Figure 4:
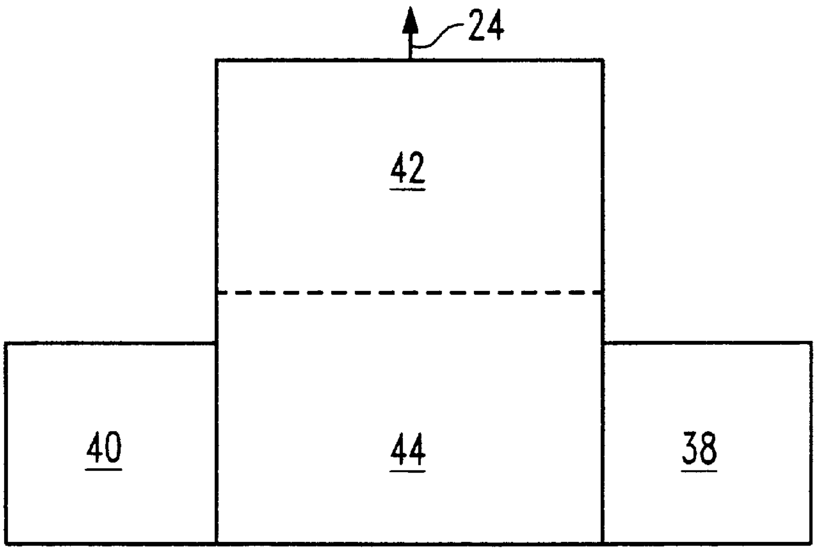
FIG. 4 is a schematic representation of the AM all-digital IBOC sub-carrier format for the spectrum illustrated in FIG. 3.

The all-digital format of FIG. 3 is very similar to the hybrid format except that the AM signal is replaced with a delayed and digitally encoded tuning and backup version of the program material. The central frequency band occupies the same spectral location in both hybrid and all-digital formats. In the all-digital format, there are two options for transmitting the main version of the program material in combination with the tuning and back-up version. FIG. 4 shows an embodiment wherein the main version of the program material is transmitted by a first group of sub-carriers 42 positioned across the central frequency band. The first group of sub-carriers 42 are modulated in quadrature with a second group of sub-carriers 44, also positioned across the central frequency band. The second group of sub-carriers carry a diversity-delayed version of the program material, which is the tuning and backup version.

Figure 5:
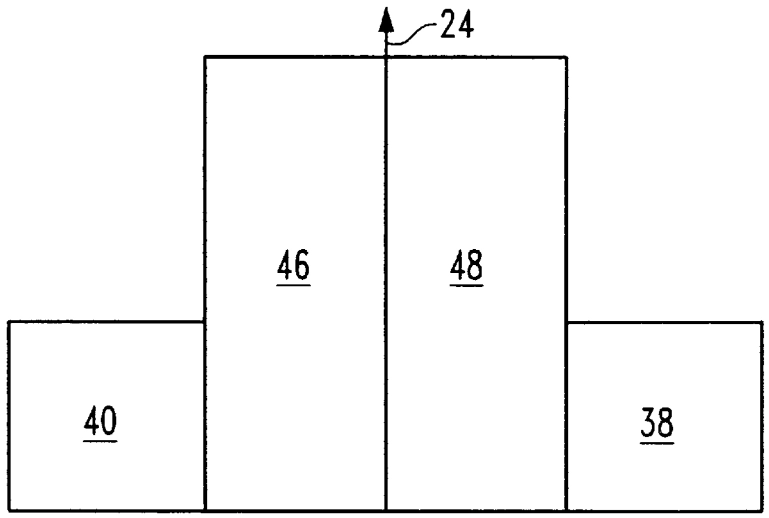
FIG. 5 is a schematic representation of an optional AM all-digital IBOC sub-carrier Format for the spectrum illustrated in FIG. 3.

Another format option for the all-digital system is to place the main channel and the tuning and back-up channels side-by-side as in FIG. 5, instead of in quadrature to each other. This alternative may be preferred in the case of a dominant first-adjacent interferer. The broadcaster in this case would place the main digitally encoded signal on the vulnerable half of the sub-carriers, while the tuning and backup digitally encoded portion is placed in the other protected half of the +-5 kHz central frequency band. This would allow main channel to be corrupted while the tuning and backup digitally encoded signal is relatively unimpaired.

FIG. 5 shows an embodiment wherein the main version of the program material is transmitted by a first group of sub-carriers 46 occupying about one half of the central frequency band. The other half of the central frequency band is occupied by a second group of sub-carriers 48 which carry the tuning and backup version. Since the tuning and backup segment is received without additional delay at the receiver, it is used for reduced access time at the receiver, and is located in the more-protected center of the channel along with the main digitally encoded version of the program material.

The all-digital system has been designed to be constrained within +−10 kHz of the channel central frequency, $f_c$, where the main audio information is transmitted within +−5 kHz of $f_c$, and the less important audio information is transmitted in the wings of the channel mask out to +−10 kHz at a lower power level. This format allows for graceful degradation of the signal while increasing coverage area. The all-digital system carries a digital time diversity tuning and backup channel within the +−5 kHz protected region (assuming the digital audio compression was capable of delivering both the main and audio backup signal within the protected +−5 kHz). The modulation characteristics of the AM all-digital system are based upon the AM IBOC hybrid system, describe in U.S. Pat. No. 5,588,022 and recent modifications thereof, see for example, D. Hartup, D. Alley, D. Goldston, "AM hybrid IBOC DAB System," presented at the NAB Radio Show, New Orleans, Sept. 1997 and IEEE 47$^{th}$ Annual Broadcast Symposium, Wash. D.C., September 1997.

A significant functional difference between the hybrid and all-digital formats is the particular signal used for the time diversity tuning and backup. The hybrid system uses the analog AM signal, while the all-digital system replaces the analog AM signal with the low-rate digital tuning and backup coded signal. In the all-digital system, both backup diversity signals can occupy the same bandwidth and spectral location. Furthermore, the complication of interference to and from second adjacent signals is eliminated by band-limiting the DAB signals to +−10 kHz. Since locations of sub-carriers potentially impacted by the first adjacent interferers is easily identified, these sub-carriers would hold optional digitally encoded information (less important program material) to increase audio quality.

The minimum required embedded digitally encoded information, along with the required diversity backup signal resides in the protected bandwidth region within +−5 kHz from the center carrier. Any additional digitally encoded information (to enhance the audio quality of the program material over the minimum) is placed in the "wings" between 5 kHz and 10 kHz away from the center carrier on each side to avoid any second adjacent interference. This partitioning of digitally encoded segments leads to four equal-size segments (i.e. both main digitally encoded and backup AM or digitally encoded segments in the protected central frequency band +−5 kHz region, and one segment in each of the two wings). In the preferred embodiments, each digitally encoded segment is carried on ten 32-QAM sub-carriers having a raw (uncoded) throughput of about 21.5332 kbps. Overhead, including FEC and equalization training, reduces each segment's throughput. In order to minimize first adjacent interference, the wings from 5 kHz to 10 kHz on either sideband should be transmitted at a lower power than the main digitally encoded over +−5 kHz.

A perceptual audio coding audio compression algorithm is an improved method of enabling DAB delivery with substantially increased coverage through graceful degradation of the audio quality, while tolerating severe interference from a second or first-adjacent signal. The digitally encoded audio compression algorithm is an embedded audio compression technique where improved audio quality over the minimum audio signal is achieved by adding segments of decoded digitally encoded data to the minimum protected segment of bits. The improvement over the previous embedded digitally encoded technique results from the added flexibility in combining segments of digitally encoded information.

All second-adjacent (or higher) interference can be eliminated if the DAB bandwidth is confined to within +−10 kHz (analog AM shall be limited to +−5 kHz).

An embedded coding technique is required to accommodate embedded compressed audio rates of roughly 16, 32 and 48 kbps using the above digitally encoded technique. Variations in the actual information rate of the 3 segments is a function of error protection versus audio quality. The rates of the 3 segments were determined as a result of examining interference patterns of first adjacent signals over 20 Hz of bandwidth leading to a digitally encoded throughput of about 16 kbps for each of 4 digitally encoded segments (3 digitally encoded segments plus analog AM for the hybrid system), as described in the introduction.

In one option, a 32-QAM modulation with modest rate 4/5 trellis code modulation (TCM) is concatenated with a Reed Solomon RS(64,56) forward error correction (FEC) code for each digitally encoded segment. A training sequence is transmitted on alternate subcariers every eighth OFDM symbol for equalization purposes. This results in a throughput of approximately 15 kbps.

A second option can increase the digitally encoded throughput to approximately 18.84 kbps by eliminating the TCM FEC coding, but retaining the Reed Solomon [RS(64, 56)] block code and training sequence.

Other throughputs between approximately 15 kbps and 18 kbps can be achieved by varying the FEC code rates. However, it is important to at least provide some means of error detection to facilitate error concealment within the digitally encoded decoder. For the remainder of this description it will be assumed that the throughput for each digitally encoded embedded segment is nominally about 16 kbps.

To achieve acceptable audio quality, the digitally encoded rates needed here are 16 kbps throughput for each of 3 segments including the central frequency band and the two sidebands. The central frequency band segment, identified here as main digitally encoded signal, should be able to provide a minimum-quality audio signal at 16 kbps when neither of the two sidebands are available. A redundant and delayed version of the central frequency band segment for tuning and backup is also transmitted in the all-digital system; it is identified here as tuning and backup signal. This redundant signal is replaced by the AM analog signal in the hybrid system. When this central frequency band digitally encoded signal plus either one of the two digitally encoded sidebands is available, the two 32 kbps sections combine to create a 32 kbps digitally encoded stereo audio signal. When all three 32 kbps segments are available, the effective digitally encoded rate is 48 kbps.

Provision for a modest datacasting capability can be accomplished, dynamically, by "stealing" bits from the digitally encoded compressed audio frames within the digitally encoded frame formatting. A broadcaster must then decide to compromise audio quality for data throughput.

One format option can be considered for increasing robustness of both hybrid and all-digital systems. If the digitally encoded segments in each wing were instead made identical (embedded digitally encoded), better error correction techniques can be exploited. However, the effective digitally encoded throughput rate would be limited to 32 kbps.

Figure 6:
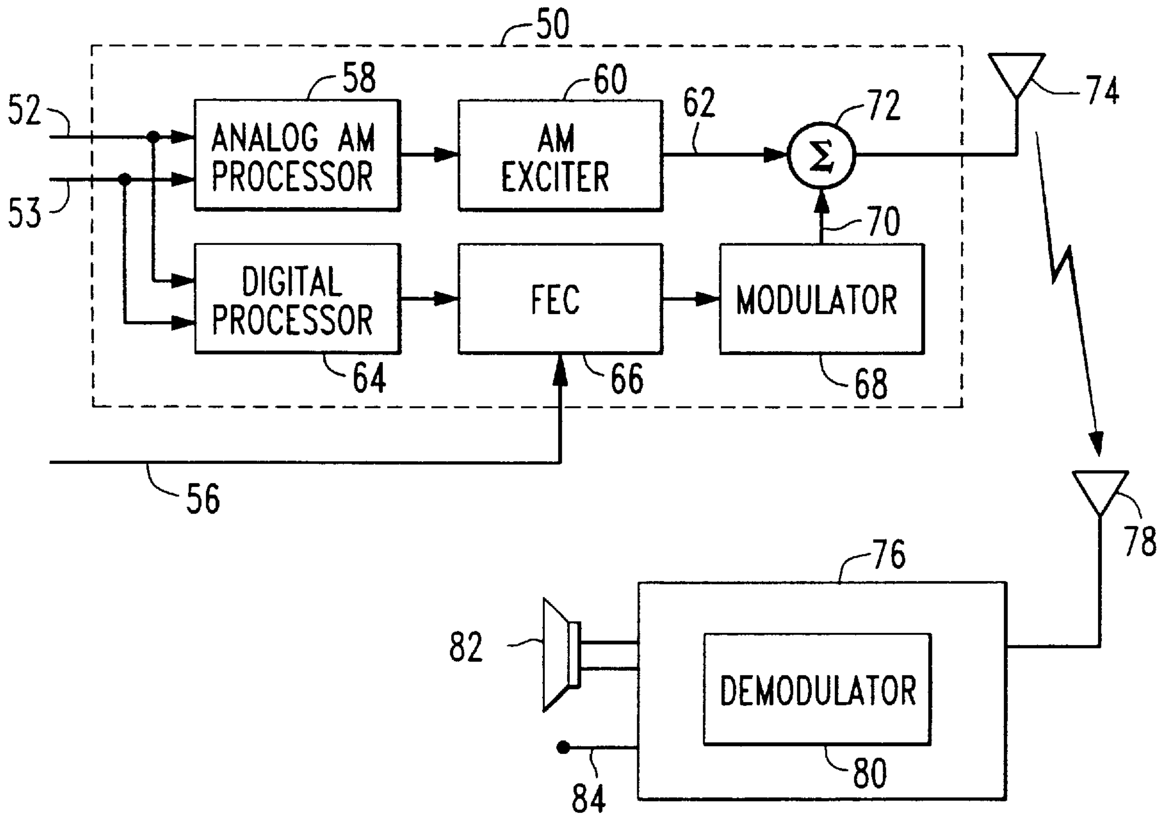
FIG. 6 is a simplified block diagram of a broadcasting system which may incorporate the modulation method of the present invention.

FIG. 6 is a greatly simplified block diagram of a digital audio broadcast system constructed in accordance with the invention. A transmitter 50 includes inputs 52 and 54 for receiving left and right channels of the program material. A separate data input 56 is included for an additional data signal, particularly for use with the all-digital modulation format of this invention. The transmitter includes an analog AM processor 58 and AM exciter 60 which operate in accordance with prior art processors and exciters to produce an analog AM broadcast signal on line 62. The inputs 52 and 54 are also fed to a coding processor 64 which converts the program material in digitally encoded signals that are error corrected in block 66 and fed to a modulator 68 which applies the coded signals to the plurality of sub-carriers using orthogonal frequency division modulation. The output 70 of the modulator is summed with the signal on line 62 in summer 72 and sent to antenna 74. The receiver 76 receives the transmitted signal on antenna 78 and demodulates the signal in demodulator 80 to recover the program material and associated data, if included. The audio information is sent to a speaker 82 and additional data, if any, is provided to output 84, which may be fed to a display or other device that can further process the data.

Compatible AM hybrid and all-digital In-Band On Channel (IBOC) Digital Audio Broadcast (DAB) formats have been shown above. Both formats are confined within a 20 Hz AM channel bandwidth, and share a common FEC code designed for 32-QAM over equal size portions of embedded digitally encoded code segments. The all-digital format is designed to be backward compatible with the AM hybrid, which is backward compatible with the analog AM. The use of digitally encoded audio compression, combined with a complementary AM spectrum format designed to accommodate the unique interference and channel characteristics of the AM channel, offers a dramatic improvement in audio quality over the existing AM analog signal. The resulting stereo DAB signal is free from the noise associated with standard AM broadcast reception, while providing increased audio dynamic range and bandwidth.

The compatible AM hybrid and all-digital In-Band On Channel (IBOC) Digital Audio Broadcast (DAB) format presented here share a common FEC code designed for 32-QAM over equal size portions of embedded digitally encoded signal segments. The all-digital formats are designed to be backward compatible with the AM hybrid IBOC and AM analog systems. Both hybrid and all-digital systems are bandlimited to +−10 kHz, thereby eliminating second adjacent interference. Commonality between both the hybrid and all-digital systems is now established through modification of unnecessary or arbitrary attributes of the hybrid system, which was originally designed independently of the all-digital system.

While the present invention has been described in terms of what are at present believed to be its preferred embodiments, it should be understood that various changes may be made without departing fromt the scope of the invention as defined by the claims.

What is claimed is:

1. A method of receiving broadcast program material, the method comprising the steps of:

receiving a broadcast signal including a center channel signal in a central frequency band of an AM radio channel, said center channel signal being modulated by a tuning version of program material and a diversity version of the program material, said tuning version of program material being delayed with respect to said diversity version of the program material, a first plurality of sub-carriers in an upper sideband of said AM radio channel modulated with first additional program material, and a second plurality of sub-carriers in a lower sideband of said AM radio channel modulated with second additional program material;

demodulating a first portion of said center channel signal to recover said tuning version of program material;

using said tuning version of program material to produce an initial audio output;

demodulating a second portion of said center channel signal to recover said diversity version of the program material; and using said diversity version of program material to produce a subsequent audio output.

2. The method of claim 1, wherein the center channel signal comprises:

an analog modulated carrier being modulated by the tuning version of the program material; and a third plurality of sub-carriers being modulated by the diversity version of the program material, wherein the third plurality of sub-carriers are transmitted at a power spectral density level that is less than the power spectral density of the analog modulated carrier.

3. The method of claim 1, wherein the center channel signal comprises:

a third plurality of sub-carriers modulated with the tuning version of the program material; and a fourth plurality of sub-carriers modulated with the diversity version of the program material.

4. The method of claim 3, wherein:

said third and fourth pluralities of sub-carriers are evenly spaced within the central frequency band; and said third plurality of sub-carriers are modulated in quadrature with said fourth plurality of sub-carriers.

5. The method of claim 3, wherein:

said third plurality of sub-carriers are positioned within an upper portion of the central frequency band; and said fourth plurality of sub-carriers are positioned within a lower portion of the central frequency band.

6. The method of claim 1, wherein the sub-carriers in said first and second pluralities of sub-carriers that are positioned farthest from the center of the channel are transmitted at higher power spectral densities than the sub-carriers that are positioned closer to the center of the channel.

7. The method of claim 1, further comprising the steps of:

detecting errors in the transmission of said first and second additional program material; and deleting said first and second additional program material when said errors exceed a preselected level.

8. The method of claim 1, further comprising the step of:

using said tuning version of program material to produce said subsequent audio output if the diversity version of the program material becomes corrupted.

9. The method of claim 1, further comprising the step of:

combining at least one of the first and second additional program materials with the diversity program material prior to the step of using said diversity version of program material to produce the subsequent audio output.

10. The method of claim 1, wherein the broadcast signal further includes additional data, said method further comprising the step of:

outputting said additional data.

11. A receiver for receiving broadcast program material, the receiver comprising:

means for receiving a broadcast signal including a center channel signal in a central frequency band of an AM radio channel, said center channel signal being modulated by a tuning version of program material and a diversity version of the program material, said tuning version of program material being delayed with respect to said diversity version of the program material, a first plurality of sub-carriers in an upper sideband of said AM radio channel modulated with first additional program material, and a second plurality of sub-carriers in a lower sideband of said AM radio channel modulated with second additional program material;

means for demodulating a first portion of said center channel signal to recover said tuning version of program material and for demodulating a second portion of said center channel signal to recover said diversity version of program material; and means for using said tuning version of program material to produce an initial audio output and for using said diversity version of program material to produce a subsequent audio output.

12. The receiver of claim 11, further comprising:

means for detecting errors in the transmission of said first and second additional program material; and means for deleting said first and second additional program material when said errors exceed a preselected level.

13. The receiver of claim 11, further comprising:

means for using said tuning version of program material to produce said subsequent audio output if the diversity version of the program material becomes corrupted.

14. The receiver of claim 11, further comprising:

means for combining at least one of the first and second additional program materials with the diversity program material.

15. The receiver of claim 11, wherein the broadcast signal further includes additional data, said receiver further comprising:

means for outputting said additional data.

16. A receiver for receiving broadcast program material, the receiver comprising:

an antenna for receiving a broadcast signal including a center channel signal in a central frequency band of an AM radio channel, said center channel signal being modulated by a tuning version of program material and a diversity version of the program material, said tuning version of program material being delayed with respect to said diversity version of the program material, a first plurality of sub-carriers in an upper sideband of said AM radio channel modulated with first additional program material, and a second plurality of sub-carriers in a lower sideband of said AM radio channel modulated with second additional program material;

a demodulator for demodulating a first portion of said center channel signal to recover said tuning version of program material and for demodulating a second portion of said center channel signal to recover said diversity version of program material; and a speaker for using said tuning version of program material to produce an initial audio output and for using said diversity version of program material to produce a subsequent audio output.

17. The receiver of claim 16, further comprising:

means for detecting errors in the transmission of said first and second additional program material; and means for deleting said first and second additional program material when said errors exceed a preselected level.

18. The receiver of claim 16, wherein the demodulator combines at least one of the first and second additional program materials with the diversity program material.

19. The receiver of claim 16, wherein the broadcast signal further includes additional data, said receiver further comprising:

an output for outputting said additional data.

* * * * *

UNITED STATES PATENT AND TRADEMARK OFFICE

CERTIFICATE OF CORRECTION

PATENT NO. : 6,487,256 B2 
DATED : November 26, 2002
INVENTOR(S) : Brian William Kroeger, E. Glynn Walden and George Nicholas Ebert It is certified that error appears in the above-identified patent and that said Letters Patent is hereby corrected as shown below:

Title page,
Item [75], Inventors, "Eberl" should read -- Ebert --.

Column 3,
Lines 8 and 10, "20 Hz" should read -- 20 kHz --.

Column 6,
Line 23, "20Hz" should read -- 20 kHz --.
Line 32, "subcariers" should read -- subcarriers --.

Column 7,
Line 33, "20 Hz" should read -- 20 kHz --.

Signed and Sealed this

Nineteenth Day of October, 2004

JON W. DUDAS
*Director of the United States Patent and Trademark Office*

UNITED STATES PATENT AND TRADEMARK OFFICE

CERTIFICATE OF CORRECTION

PATENT NO. : 6,487,256 B2
APPLICATION NO. : 09/834077
DATED : November 26, 2002
INVENTOR(S) : Brian William Kroeger et al.

It is certified that error appears in the above-identified patent and that said Letters Patent is hereby corrected as shown below:

Title Page,
Item [75], Inventors, the last inventor last name “Eberl” (as deleted by Certificate of Correction issued October 19, 2004) should be reinstated.

Signed and Sealed this

Ninth Day of January, 2007

JON W. DUDAS
*Director of the United States Patent and Trademark Office*